US011927313B2

(12) United States Patent
Ma et al.

(10) Patent No.: US 11,927,313 B2
(45) Date of Patent: Mar. 12, 2024

(54) FLASHLIGHT HAVING PLURAL LIGHT SOURCES WITH COMMON FLUORESCENT ELEMENT

(71) Applicant: SHENZHEN LIGHTING INSTITUTE, Guangdong (CN)

(72) Inventors: Yong Ma, Guangdong (CN); Huancheng Jiang, Guangdong (CN); Bin Chen, Guangdong (CN); Xingjia Chen, Guangdong (CN)

(73) Assignee: Shenzhen Lighting Institute, Guangdong (CN)

( * ) Notice: Subject to any disclaimer, the term of this patent is extended or adjusted under 35 U.S.C. 154(b) by 8 days.

(21) Appl. No.: 17/782,963

(22) PCT Filed: Dec. 8, 2020

(86) PCT No.: PCT/CN2020/134402
§ 371 (c)(1),
(2) Date: Jun. 6, 2022

(87) PCT Pub. No.: WO2021/115238
PCT Pub. Date: Jun. 17, 2021

(65) Prior Publication Data

US 2023/0003350 A1 Jan. 5, 2023

(30) Foreign Application Priority Data

Dec. 9, 2019 (CN) ......................... 201911250802.7

(51) Int. Cl.
*F21L 4/02* (2006.01)
*F21V 9/35* (2018.01)
(Continued)

(52) U.S. Cl.
CPC ................ *F21L 4/022* (2013.01); *F21V 9/35* (2018.02); *F21V 13/045* (2013.01); (Continued)

(58) Field of Classification Search
CPC . F21L 4/025; F21L 4/022; F21L 4/027; F21L 4/02; F21V 9/30; F21V 9/32; F21V 13/045; F21V 13/14
See application file for complete search history.

(56) References Cited

U.S. PATENT DOCUMENTS 1,958,796 A * 5/1934 Mercer .................. F21V 17/02 362/187
5,535,230 A * 7/1996 Abe .......................... F21K 9/69 372/50.23
(Continued)

FOREIGN PATENT DOCUMENTS

CN 203104869 U 7/2013
CN 103511841 A 1/2014
(Continued)

OTHER PUBLICATIONS

International Search Report for PCT Application No. PCT/CN2020/134402, dated Feb. 25, 2021, in 8 pages.

*Primary Examiner* — Ismael Negron
(74) *Attorney, Agent, or Firm* — Knobbe, Martens, Olson & Bear, LLP

(57) ABSTRACT

A flashlight including a lens assembly having an adjusting element; and a light source assembly provided at one side of the lens assembly. The light source assembly includes a first light source, a second light source, an excitation element, and a light path adjusting element. Light emitted from the first light source irradiates the excitation element to generate first exciting light, and light emitted from the second light source irradiates the excitation element to generate second exciting light. The first exciting light and the second exciting light sequentially pass through the light path adjusting element and the adjusting element, and are outputted simultaneously.

20 Claims, 5 Drawing Sheets

(51) Int. Cl.
*F21V 13/04* (2006.01)
*F21V 14/06* (2006.01)
*F21V 29/503* (2015.01)
*F21Y 115/10* (2016.01)

(52) U.S. Cl.
CPC .......... *F21V 14/065* (2013.01); *F21V 29/503* (2015.01); *F21Y 2115/10* (2016.08)

(56) References Cited

U.S. PATENT DOCUMENTS

| | | | | |
|---|---|---|---|---|
| 7,534,975 | B1 * | 5/2009 | Sharrah | F21L 4/027 200/600 |
| 7,692,136 | B2 * | 4/2010 | Blees | G01J 3/02 362/184 |
| 8,152,327 | B2 * | 4/2012 | Brands | F21V 5/04 362/213 |
| 8,393,751 | B2 * | 3/2013 | Qiu | F21V 14/025 362/208 |
| 8,444,290 | B2 * | 5/2013 | Opolka | F21V 29/507 362/249.02 |
| 9,140,417 | B2 * | 9/2015 | Chen | F21V 14/065 |
| 10,132,482 | B1 * | 11/2018 | Redpath | F21V 23/04 |
| 2005/0122712 | A1 * | 6/2005 | Kim | H05B 47/10 362/184 |
| 2005/0157492 | A1 * | 7/2005 | Chiu | F21V 5/006 362/205 |
| 2008/0074869 | A1 * | 3/2008 | Okishima | F21L 4/00 362/184 |
| 2014/0268703 | A1 * | 9/2014 | Ehlert | F21V 23/04 362/208 |

FOREIGN PATENT DOCUMENTS

| | | | |
|---|---|---|---|
| CN | 106369485 | A | 2/2017 |
| CN | 109578832 | A | 4/2019 |
| CN | 110107827 | A | 8/2019 |
| CN | 110360471 | A | 10/2019 |
| CN | 211551215 | U | 9/2020 |
| JP | 2006286615 | A | 10/2006 |

* cited by examiner

FLASHLIGHT HAVING PLURAL LIGHT SOURCES WITH COMMON FLUORESCENT ELEMENT

TECHNICAL FIELD

The present disclosure relates to the field of lighting, in particular to a flashlight.

BACKGROUND

Flashlight has become a commonly used lighting tool in people's daily life and work. At present, all flashlights on the market use a single light source, and the flashlight with the single light source has a simple structure and has a limited luminous ability, which cannot meet the demands of multiple application scenarios.

SUMMARY

The present disclosure mainly provides a flashlight to solve the problem in the related art that that the flashlight with a single light source has certain defects.

In order to solve the above technical problems, a flashlight is provided. The flashlight includes a lens assembly including an adjusting element; and a light source assembly arranged at a side of the lens assembly. The light source assembly includes a first light source, a second light source, an excitation element, and a light-path adjusting element. Light beams emitted by the first light source are incident onto the excitation element to generate first excitation light, and light beams emitted by the second light source are incident onto the excitation element to generate second excitation light, and beams of the first and second excitation lights are outputted simultaneously after passing through the light-path adjusting element and the adjusting element in sequence.

In an embodiment, the light source assembly includes a light source holder on which the first light source, the second light source, and the light-path adjusting element are arranged; and an optical axis of the first light source coincides with an optical axis of the second light source, and the optical axis of the first light source and the optical axis of the second light source are perpendicular to an optical axis of the adjusting element; the light-path adjusting element is located on a light-exiting path of the first light source, and the excitation element is arranged between the first light source and the light-path adjusting element; the light-path adjusting element has a first region for transmitting light beams emitted by the second light source, and the light beams emitted by the second light source are incident onto the excitation element after passing through the first region; and both the first excitation light and the second excitation light are guided to the adjusting element by the light-path adjusting element.

In an embodiment, the first region is configured to reflect the first excitation light and the second excitation light.

In an embodiment, the first region is a light-transmitting hole.

In an embodiment, the first light source is an LED light source, the second light source is a laser light source, the light-path adjusting element is a reflector provided with the first region, and the reflector has a reflective surface facing towards the first light source.

In an embodiment, a first lens is provided on the light-exiting path of the first light source, and the first excitation light is incident onto the reflector after passing through the first lens; and a second lens is provided on a light-exiting path of the second light source, and the light beams emitted by the second light source pass through the second lens and then are incident onto the excitation element after passing through the first region.

In an embodiment, the optical axis of the second light source passes through a center of the first region, and the center of the first region is located on the optical axis of the adjusting element.

In an embodiment, the flashlight further includes: a heat dissipation assembly connected to the lens assembly and defining an accommodating cavity. The light source assembly is fixed to the heat dissipation assembly and is located in the accommodating cavity.

In an embodiment, the lens assembly includes a lens holder and a heat dissipation holder. The adjusting element is arranged on the lens holder, the heat dissipation holder has one end slidably disposed on the lens holder and another end connected to the heat dissipation assembly; the light source assembly is located between the heat dissipation assembly and the lens holder; and the lens holder is configured to slide relative to the heat dissipation holder to move towards or away from the light source assembly.

In an embodiment, the heat dissipation holder is sleeved on the lens holder, and the lens assembly further includes a lens cover sleeved on an end of the lens holder away from the heat dissipation holder. The lens cover is configured to limit the heat dissipation holder when the lens holder gets close to the light source assembly. The lens holder is provided with a flange at an end close to the heat dissipation holder. The flange is configured to limit the heat dissipation holder when the lens holder gets away from the light source assembly.

In an embodiment, a surface of the lens holder contacting the heat dissipation support is provided with a first groove, in which a first rubber ring is provided; and a surface of the heat dispassion holder contacting the lens holder is provided with a second groove, in which a second rubber ring is provided.

In an embodiment, a thermally conductive silica gel is provided between the light source assembly and the heat dissipation assembly.

In an embodiment, the flashlight further includes: a drive assembly; and a battery assembly. The heat dissipation assembly is provided with a communication cavity, and the drive assembly is located in the communication cavity and is electrically connected to the light source assembly; and the battery assembly is connected to an end of the heat dissipation assembly away from the lens assembly, and is electrically connected to the drive assembly.

In an embodiment, the drive assembly is configured to control the first light source with a first current or half of the first current, and to control the second light source with a second current or half of the second current.

The present disclosure provides a flashlight, the flashlight includes a lens assembly including an adjusting element, and a light source assembly arranged at a side of the lens assembly. The light source assembly includes a first light source, a second light source, an excitation element, and a light-path adjusting element. Light beams emitted by the first light source are incident onto the excitation element to generate first excitation light, and light beams emitted by the second light source are incident onto the excitation element to generate second excitation light; and beams of the first excitation light are outputted after passing through the light-path adjusting element and the adjusting element in sequence, and beams of the second excitation light are outputted after passing through the light-path adjusting element and the adjusting element in sequence. In the present disclosure, the first light source and the second light source are incident onto the excitation element to generate the first excitation light and the second excitation light, and then beams of the first excitation light are outputted after passing through the light-path adjusting element and the adjusting element in sequence, and the beams of the second excitation light are outputted after passing through the light-path adjusting element and the adjusting element in sequence, that is, the finally outputted light beams integrate the first excitation light and the second excitation light to realize the combination of multiple light sources. Therefore, the flashlight of the present disclosure can combine the advantages of the first light source and the second light source to reduce light-emitting defects in a single light source.

BRIEF DESCRIPTION OF DRAWINGS

In order to more clearly illustrate technical solutions of embodiments of the present disclosure, the drawings illustrated in the description of the embodiments are briefly described as below. Apparently, the drawings described below are merely some of the embodiments of the present disclosure. Those skilled in the art can also obtain other drawings based on these drawings without creative efforts.

DESCRIPTION OF EMBODIMENTS

The following will describe the technical solutions in the embodiments of the present disclosure in conjunction with the drawings of the embodiments of the present disclosure. Obviously, the described embodiments are merely a part of the embodiments of the present disclosure, rather than all the embodiments. Based on the embodiments of the present disclosure, all other embodiments obtained by a person of ordinary skill in the art without creative efforts shall fall within a protection scope of the present disclosure.

It should be noted that if there is a directional indication (such as up, down, left, right, front, back . . . ) in the embodiments of the present disclosure, the directional indication is only used to depict, in a specific posture shown in the accompanying drawings, a relative positional relationship between the assemblies, a movement situation, and so on. If the specific posture changes, the directional indication will also change accordingly.

In addition, if the embodiments of the present disclosure use descriptions such as "first", "second", etc., these descriptions are only illustrated for descriptive purposes, and cannot be understood as instructions or implications its relative importance or implicitly indicates the number of technical features. Therefore, the features defined with "first" and "second" can explicitly or implicitly include at least one of the features. In addition, the technical solutions provided by various embodiments can be combined with each other only when these combined solutions can be realized by a person of ordinary skill in the art. When the technical solutions that are combined with each other are contradictory to each other or the combined technical solution cannot be realized, it should be regarded that such combination of technical solutions does not exist, and will not fall within a protection scope of the present disclosure.

Figure 1:
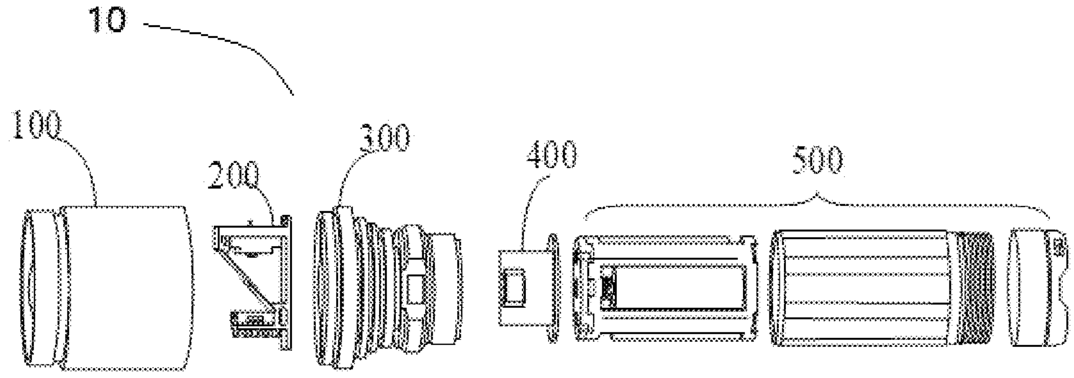
FIG. 1 is an exploded schematic diagram of a flashlight according to an embodiment of the present disclosure.

FIG. 1 is an overall schematic diagram of a flashlight 10 according to an embodiment of the present disclosure. Referring to FIG. 1, the flashlight 10 includes a lens assembly 100, a light source assembly 200, a heat dissipation assembly 300, a drive assembly 400, and a battery assembly 500. The light source assembly 200 is arranged at a side of the lens assembly 100, the heat dissipation assembly 300 is connected to the lens assembly 100, the drive assembly 400 is located in the heat dissipation assembly 300 and is electrically connected to the light source assembly 200, and the battery assembly 500 is connected to an end of the heat dissipation assembly 300 away from the lens assembly 100 and is electrically connected to the drive assembly 400.

The flashlight provided by this embodiment processes light emitted from the light source assembly 200 through driving of the drive assembly 400 and the power supply of the battery assembly 500, and achieves remote illumination and spot size adjustment through adjusting of the lens assembly 100.

Figure 2:
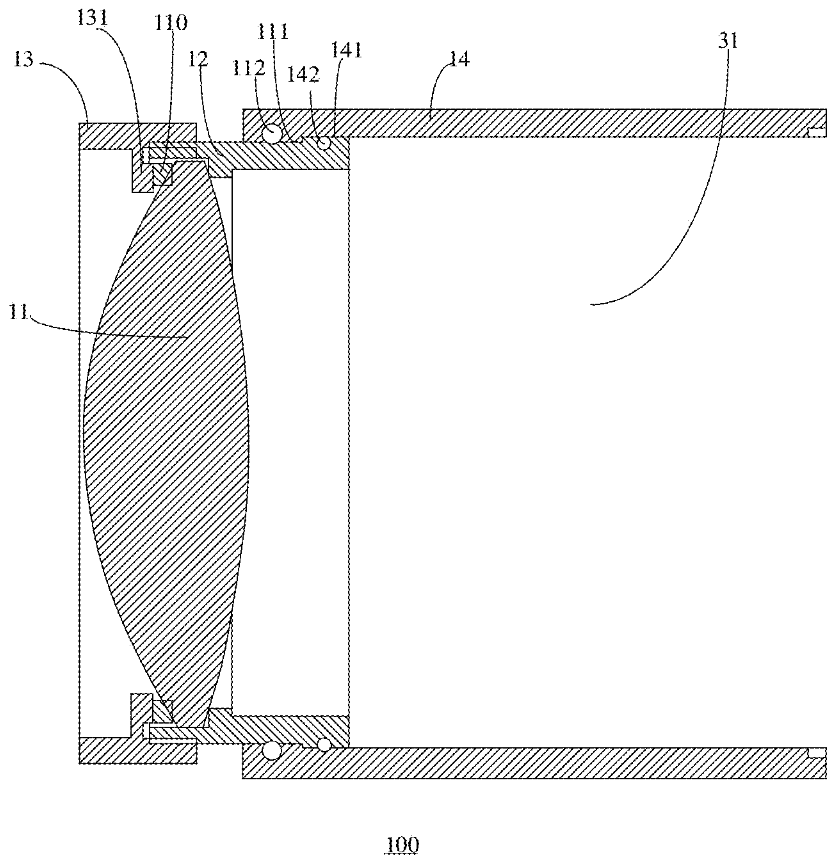
FIG. 2 is a schematic cross-sectional view of a lens assembly of the flashlight shown in FIG. 1.

Referring to FIG. 2, the lens assembly 100 includes an adjusting element 11, a lens holder 12, a lens cover 13, and a heat dissipation holder 14. The adjusting element 11 is fixed on the lens holder 12 and is configured to transmit light beams emitted by the light source assembly 200.

It can be understood that the adjusting element 11 can be clamped in the lens holder 12. Due to an irregular shape of the adjusting element 11, a thickness of a periphery of the adjusting element 11 can be different from a thickness of a center of the adjusting element 11. The adjusting element 11 can be fixed and clamped in the lens holder 12 by a sealing gasket 110. In an embodiment, the adjusting element 11 can be a flat mirror or a convex lens. When the adjusting element 11 is a convex lens, it can condense parallel light beams that pass through or diverge the condensed light beams that pass through. The adjusting element 11 is not limited in the embodiments.

The lens holder 12 is arranged around an outer circumference of the adjusting element 11. An outer surface of the lens holder 12 facing away from the adjusting element 11 is provided with a second groove 111, and a second rubber ring 112 is provided in the second groove 111 in such a manner that the lens assembly 100 and the heat dissipation assembly 300 are elastically connected to each other.

The lens cover 13 is arranged at a side of the lens holder 12 and is configured to protect the adjusting element 11, thereby preventing dust from entering the adjusting element 11 to affect the light transmission effect of the adjusting element 11. A limit part 131 is provided on an inner surface of the lens cover 13 and is configured to limit a position of the lens holder 12 on an inner surface of the lens cover 13 when the lens holder 12 gets close to the light source assembly 200. An inner surface of the lens cover 13 close to the lens holder 12 is provided with threads, and the lens cover 13 can be fixed to the lens holder 12 through the threads. Alternatively, an inner diameter of the lens cover 13 is slightly smaller than an outer diameter of the lens holder 12 in such a manner that the lens cover 13 is circularly arranged on the lens holder 12 to achieve a fixed connection.

Figure 3:
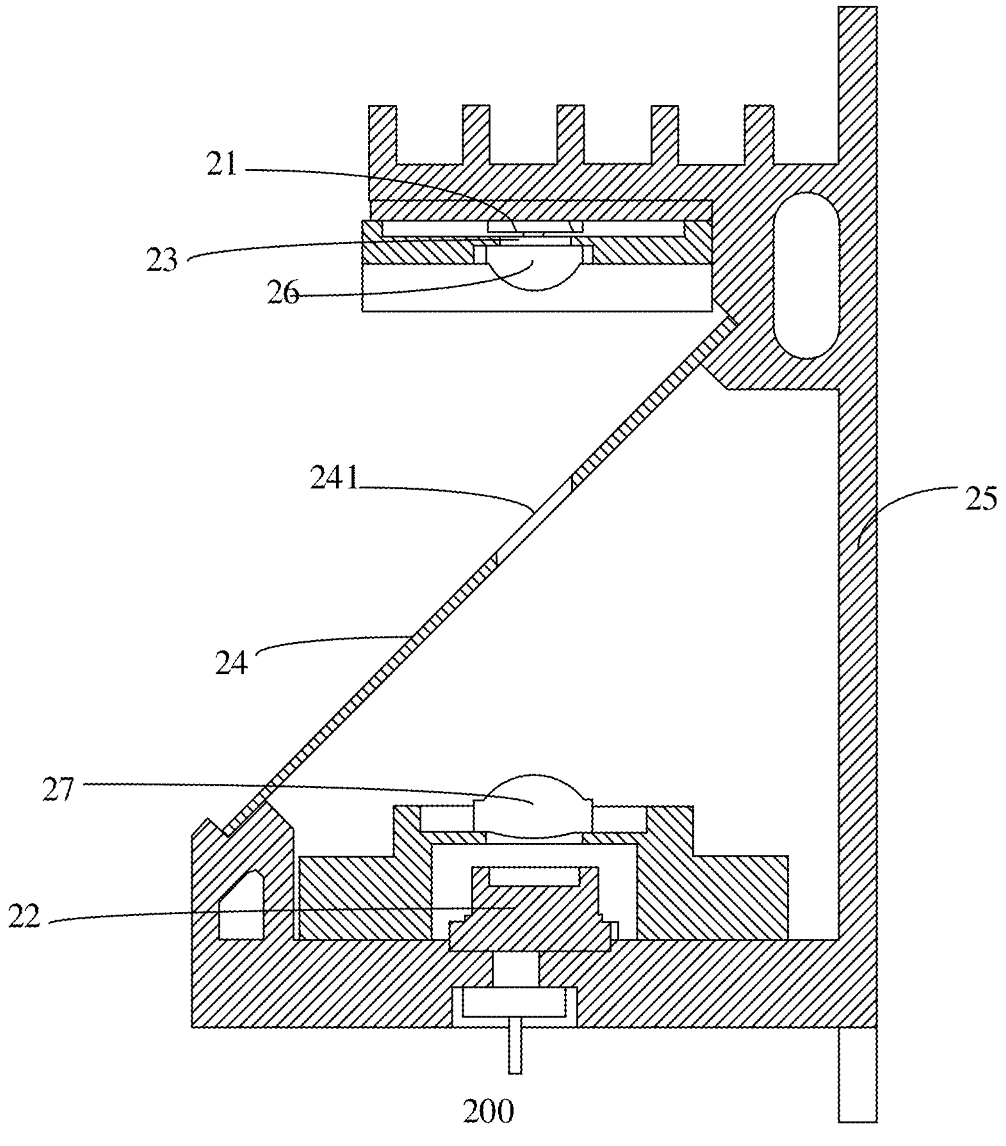
FIG. 3 is a schematic cross-sectional view of a light source assembly of the flashlight shown in FIG. 1.
Figure 4:
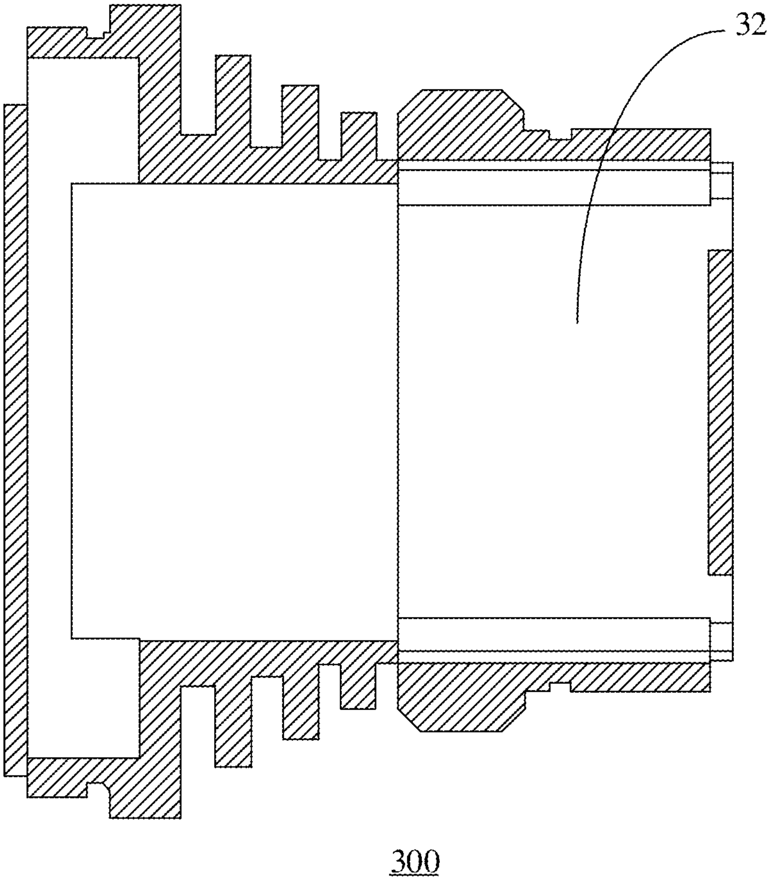
FIG. 4 is a schematic cross-sectional view of a heat dissipation assembly of the flashlight shown in FIG. 1.
Figure 5:
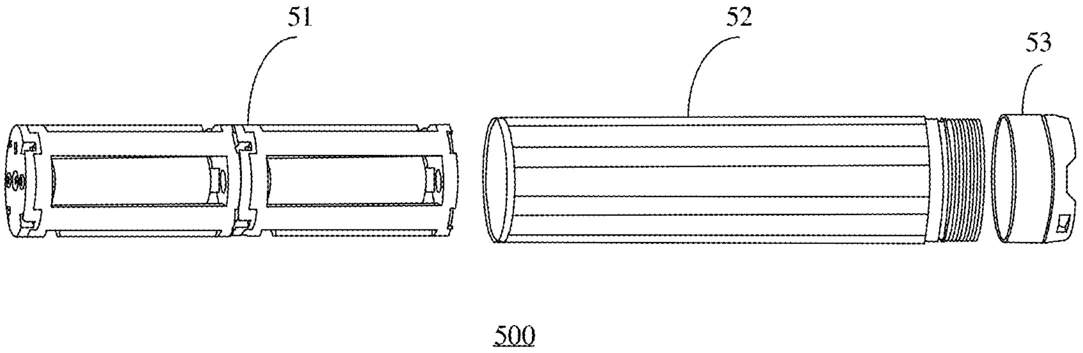
FIG. 5 is a schematic diagram of a battery assembly of the flashlight shown in FIG. 1.
Figure 6:
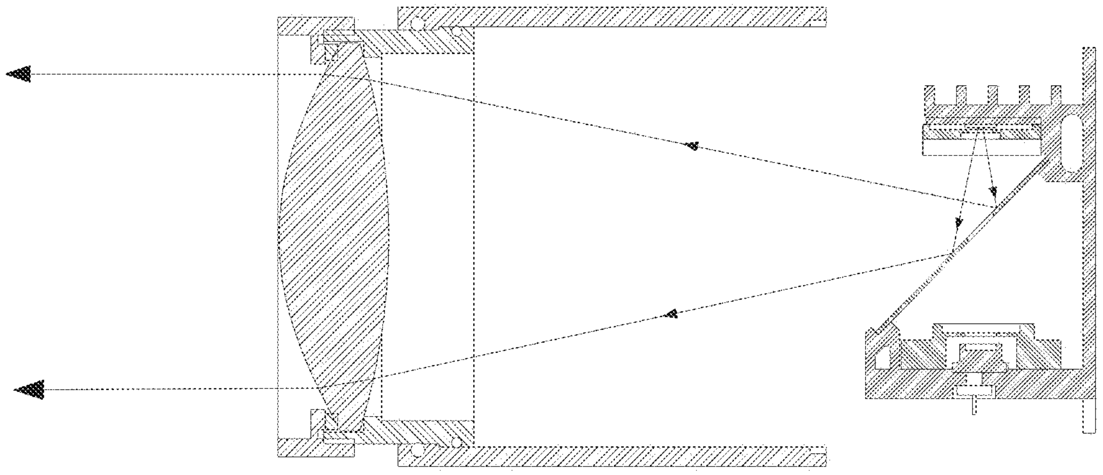
FIG. 6 is a schematic diagram illustrating a light path of light only emitted from a first light source without first and second lenses according to an embodiment of the present disclosure.
Figure 7:
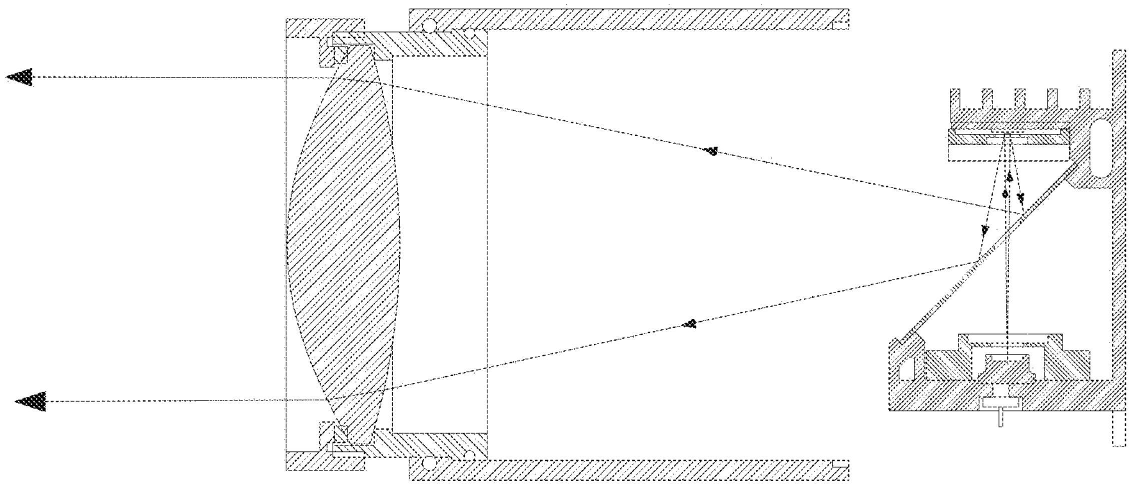
FIG. 7 is a schematic diagram illustrating a light path of light emitted from both a first light source a second light source without first and second lenses according to an embodiment of the present disclosure.
Figure 8:
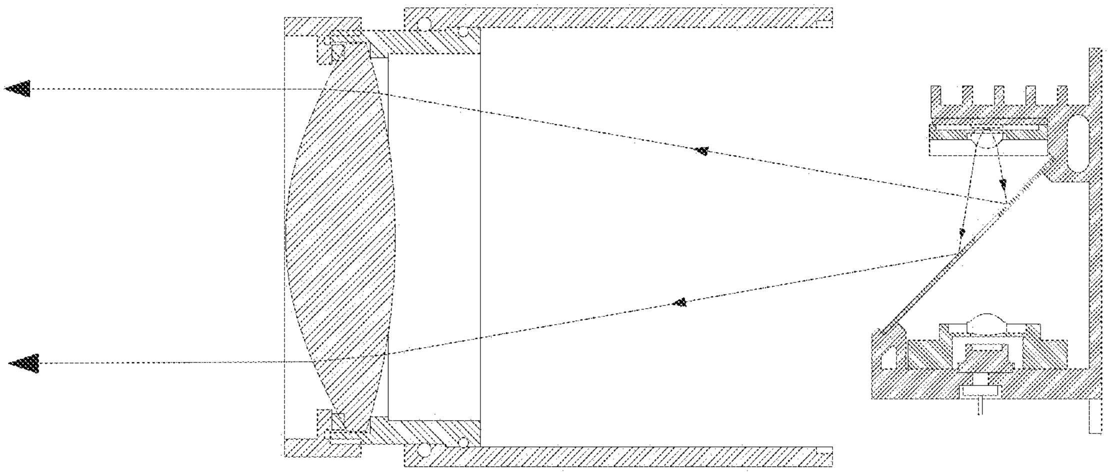
FIG. 8 is a schematic diagram illustrating a light path of light only emitted from a first light source with first and second lenses according to an embodiment of the present disclosure.
Figure 9:
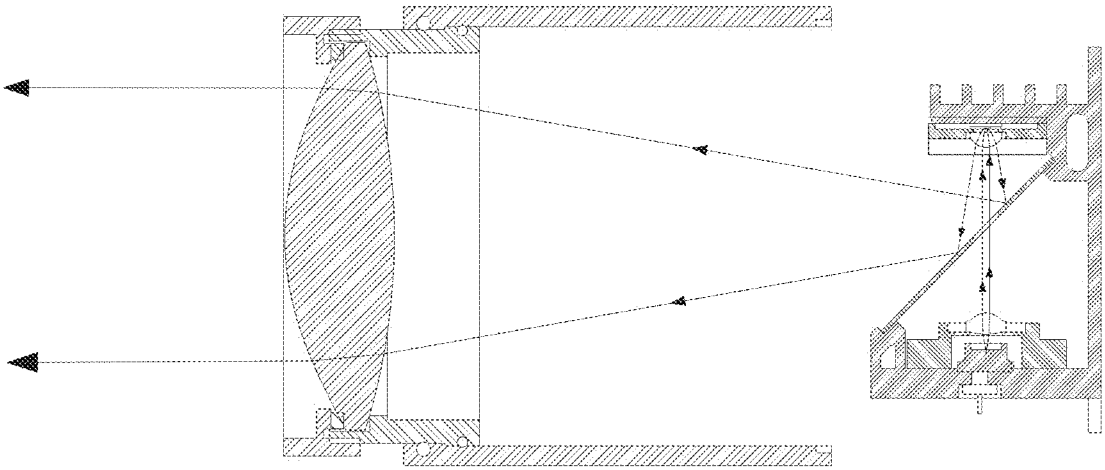
FIG. 9 is a schematic diagram illustrating a light path of light emitted from both a first light source a second light source with first and second lenses according to an embodiment of the present disclosure.

Referring to FIG. 3, the light source assembly 200 includes a first light source 21, a second light source 22, an excitation element 23, a light-path adjusting element 24, and a light source holder 25. The first light source 21, the second light source 22, and the light-path adjusting element 24 are all arranged on the light source holder 25. The first light source 21, the second light source 22, the excitation element 23, and the light-path adjusting element 24 are arranged at a same side of the light source holder 25. The first light source 21 is a light-emitting diode (LED) light source, the second light source 22 is a laser light source, the light-path adjusting element 24 is a reflector, and the light-path adjusting element 24 has a first region 241. An optical axis of the first light source coincides with an optical axis of the second light source. The optical axis of the first light source and the optical axis of the second light source are perpendicular to an optical axis of the adjusting element, and the excitation element 23 is arranged between the first light source 21 and the light-path adjusting element 24.

The excitation element 23 is a fluorescent device that is configured to excite light, such as a fluorescent powder plate that is configured to excite light beams incident onto the fluorescent powder plate, so as to cause the fluorescent powder plate to generate one or more kinds of fluorescence.

It can be understood that LED light beams emitted by the first light source 21 are incident onto the excitation element 23 to generate the first excitation light, and laser light beams emitted by the second light source 22 are incident onto the light-path adjusting element 24 and pass through the first region 241 of the light-path adjusting element 24 and then are incident onto the excitation element 23 to generate the second excitation light, and both the first excitation light and the second excitation light are guided to the adjusting element 11 by the light-path adjusting element 24, so as to achieve remote illumination.

The laser light beams emitted by the second light source 22 passes through the first region 241. The first region 241 is configured to reflect the first excitation light and the second excitation light that are generated by the excitation element 23 after being excited by the first light source 21 and the second light source 22.

In another embodiment, the first region 241 can also be a light-transmitting hole formed at the light-path adjusting element 24. The laser light beams emitted by the second light source 22 have relative small optical etendue and can completely pass through the light-transmitting hole and then be incident onto the excitation element 23. The first excitation light and the second excitation light that are generated by exciting the excitation element 23 by the first light source 21 and the second light source 22 are guided to the adjusting element 11 after passing through the light-path adjusting element 24 except the light-transmitting hole. Although part of the first excitation light and the second excitation light is lost due to the light-transmitting hole, the lost light is relatively little since the light-transmitting hole has a quite small size.

The light source assembly 200 further includes a first lens 26 and a second lens 27. The first lens 26 is arranged on a light-exiting path of the first light source 21, and the second lens 27 is arranged on a light-exiting path of the second light source 22. A center of the first light source 21, a center of the second light source 22, a center of the first lens 26, a center of the second lens 27, and a center of the first region 241 are located on a straight line.

The LED light beams emitted by the first light source 21 are incident onto the excitation element 23 to excite the fluorescence in the excitation element 23. After beams of the fluorescence are received by the first lens 26, they are reflected by the light-path adjusting element 24 to the adjusting element 11 and then are outputted. The laser light source emitted by the second light source 22 passes through the second lens 27, scatters and passes through the first region 241 of the light-path adjusting element 24, and then is incident onto the excitation element 23 after being collected by the first lens 26, so that the excitation element 23 is excited to generate fluorescence. The beams of the fluorescence are further incident onto the first lens 26, and are reflected to the adjusting element 11 via the light-path adjusting element 24 and then are outputted.

The flashlight provided by an embodiment further includes a heat dissipation assembly 300 connected to the lens assembly 100. The heat dissipation assembly 300 is fixedly provided with a light source assembly 200 at a side close to the lens assembly 100. An accommodating cavity 31 is formed between the heat dissipation assembly 300 and the lens assembly 100. The light source assembly 200 is disposed in the accommodating cavity 31 formed between the lens assembly 100 and the heat dissipation assembly 300, and a communication cavity 32 is provided at a side of the heat dissipation assembly 300 away from the lens assembly 100.

It can be understood that the lens assembly 100 can be fixed to the heat dissipation assembly 300 through threads, or an inner diameter of the heat dissipation holder 14 can be slightly smaller than a diameter of the heat dissipation assembly 300, so that the lens assembly 100 clamps on the heat dissipation assembly 300, and the lens assembly 100 is connected to the heat dissipation assembly 300 by means of the heat dissipation holder 14.

The heat dissipation holder 14 has an end slidably disposed on the lens holder 12, and another end connected to the heat dissipation assembly 300. An inner surface of the heat dissipation holder 14 close to the lens holder 12 is provided with a first groove 141, and a first rubber ring 142 is disposed in the first groove 141 in such a manner that the lens assembly 100 and the heat dissipation assembly 300 are elastically connected to each other. In this way, the adjusting element 11 can move back and forth without loosening, and the light spot size can be adjusted.

The light source holder 25 of the light source assembly 200 can be fixed to the heat dissipation assembly 300, and a thermally conductive silica gel is arranged between the light source assembly 200 and the heat dissipation assembly 300, so that the heat generated by the light source assembly 200 is absorbed by the heat dissipation holder 14 and is introduced into the heat dissipation assembly 300. In this way, the light source holder 25 not only has the function of fixing the light source assembly 200, but also can absorb the heat generated in the light source assembly 200, and the heat dissipation assembly 300 can dissipate the absorbed heat into the air to accelerate the heat transfer speed.

The flashlight 10 further includes a drive assembly 400 and a battery assembly 500. The drive assembly 400 is located in a communication cavity 32 of the heat dissipation assembly 300 and is electrically connected to the light source assembly 200, thereby realizing a compact structure of the entire flashlight 10 and making full use of the space.

The shape of the drive assembly 400 can be cylindrical, in such a manner that an outer diameter of the drive assembly 400 is embedded in the communication cavity 32 of the heat dissipation assembly 300, and the outer diameter of the drive assembly 400 is slightly greater than an inner diameter of the communication cavity 32. Alternatively, the outer diameter of the drive assembly 400 may be smaller than the inner diameter of the communication cavity 32, and a protrusion is provided on the outer surface of the drive assembly 400, and a distance from the outer surface of the protrusion to a central axis of the drive assembly 400 is slightly greater than the inner diameter of the communication cavity 32 to increase a static friction force between the drive assembly 400 and the heat dissipation assembly 300. In some embodiments, there are at least two protrusions, and the number of the protrusions can be 2, 3, etc., and the protrusions can have a shape of a cylinder, a frustum of a cone, etc. The number and the shape of the protrusions are not limited in the embodiments.

In an embodiment, a switch element can also be provided at the drive assembly 400 to control the flashlight 10 to be turned on or turned off, or a torsion-type switch element can be provided at the drive assembly 400 to turn on or turn off the flashlight 10 by twisting a body of the flashlight 10. The position and the switching mode of the switch element are not limited in the embodiments.

The drive assembly 400 has a battery reverse connection function and has two paths of output. If a path A is the first light source 21, that is, the LED light source output, then a path B is the second light source 22, that is, the laser light source output. The drive assembly 400 is configured to control an output of the first light source 21 with a first current or half of the first current, and to control an output of the second light source 22 with a second current or half of the second current. In an embodiment, the first current is 2 A, and the second current is 2 A.

It can be understood that the switch element is clicked to turn on the flashlight 10, and the drive assembly 400 controls the output of at least one of the first light source 21 or the second light source 22, that is, the output of the first light source 21, or the output of the second light source 22, or both the output of the first light source 21 and the output of the second light source 22.

In an embodiment, the switch element is clicked to turn on the flashlight 10, and the drive assembly 400 can control the path A to output half of the first current, at this time, the path A is half bright, and a switch indicator has a green color; the drive assembly 400 controls the path A to output the first current, at this time, the path A is all bright, and the switch indicator has a green color; the drive assembly 400 controls the path B to output half of the second current, at this time, the path A is half bright and the path B is all bright, and the switch indicator has a blue color; and the drive assembly 400 controls the path B to output the second current, the path B is all bright, and the switch indicator has a blue color. In any state, the flashlight 10 enters the SOS mode when double clicking the switch element, at this time, the path A has a current of 2 A, the path B has a current of 2 A, and the switch indicator has a while color, and then the switch element is clicked to return to its original state, and the flashlight is turned off after the switch element is pressed for a long time.

In some embodiments, the flashlight 10 is further provided with a temperature control protection unit and a low battery protection unit. When the temperature is higher than a preset temperature threshold, the flashlight 10 will automatically change to the mode in which the drive assembly 400 controls the path A to be half-bright with half of the first current. At this time, the indicator has a green color. The predetermined temperature threshold may be 60°, and is not limited herein by the embodiments.

In the low battery protection unit, when the battery voltage is lower than a first preset voltage threshold, the indicator has a red color. When the battery voltage is lower than a second preset voltage threshold, the flashlight 10 is automatically turned off. The first preset voltage threshold may be 6.2V, and the second preset voltage threshold may be 5.6V, which will not be limited herein by the embodiments.

A side of the drive assembly 400 away from the lens assembly 100 is connected to the battery assembly 500. The battery assembly 500 includes a battery holder 51, a battery compartment 52, and a battery tail compartment 53. The battery holder 51 is movably accommodated in the battery compartment 52 and has a length smaller than or equal to a length of the battery compartment 52. The battery compartment 52 and the battery tail compartment 53 can be connected to each other through threads, or through other manners, for example, embedding, so that the battery compartment 52 is clamped in the battery tail compartment 53, or the battery tail compartment 53 is clamped in the battery compartment 52, thereby achieving connection and fixation.

The battery holder 51 may include one or more sections. The batteries are placed in the battery holder 51 so that the battery holder 51 has one end that is s a positive electrode and another end that is a negative electrode. When multiple battery holders 51 are provided, the positive electrodes and the negative electrodes of the multiple battery holders 51 are alternately connected to each other in such a manner that the multiple battery holders 51 are connected in series, and the number of the sections and length of the battery holder 51 are not limited in the embodiments. A peripheral side of the battery holder 51 can be hollow, so as to save the material cost of the battery holder 51.

Correspondingly, the length of the battery compartment 52 corresponding to the battery holder 51 changes. Each time one more battery holder 51 is provided, the length of the battery compartment 52 correspondingly increases by the length of one battery holder 51. The outer side of the battery compartment 52 can have irregular patterns, such as stripes, and can also be configured to be smooth and non-slip plastic is provided thereon, so as to achieve a non-slip effect.

In the embodiments, the first light source 21 and the second light source 22 are provided in the light source assembly 200, the light beams emitted by the first light source 21 are incident onto the excitation element 23 to generate the first excitation light, the light beams emitted by the second light source 22 are incident onto the excitation element 23 to generate the second excitation light, the beams of the first excitation light are outputted after passing through the light-path adjusting element 24 and the adjusting element 11 in sequence, and the beams of the second excitation light are outputted after passing through the light-path adjusting element 24 and the adjusting element 11 in sequence. The high-endurance excitation element 23 is used as the conversion material, so that the flashlight 10 can have a stable structure, thereby realizing remote illumination. In the lens assembly 200, the lens holder 12 is elastically connected to the heat dissipation holder 14, so that the adjusting element 11 can moving back and forward without loosening and thus the spot size can be adjusted; meanwhile, the battery assembly 500 is configured to have the battery holder 51 and the battery compartment 52 whose lengths are adjustable, so that the battery capacity is increased and the battery life is increased.

Based on the flashlight 10 shown in FIG. 1 to FIG. 5 in the above embodiments, an exemplary scenario is described in the following.

In an exemplary scenario, when the switch element is clicked for a first time, the drive assembly 400 controls the first light source 21 on the path A to supply power with half of the first current, the light beams emitted by the first light source 21 are incident onto the excitation element 23 to cause the excitation element 23 to generate the first excitation light, and beams of the first excitation light pass through the first lens 26 and are guided by the light-path adjusting element 24 to the adjusting element 11 and then are outputted; then when the switch element is clicked for a second time, the drive assembly 400 controls the first light source 21 on the path A to supply power with the first current, and the light beams emitted by the first light source 21 are incident onto the excitation element 23 to cause the excitation element 23 to generate the first excitation light, and beams of the first excitation light pass through the first lens 26 and are guided by the light-path adjusting element 24 to the adjusting element 11 and then are outputted; then when the switch element is clicked for a third time, the drive assembly 400 controls the second light source 22 on the path B to supply power with half of the second current, and controls the first light source 21 on the path A to supply power with half of the first current, the light beams emitted by the first light source 21 are incident onto the excitation element 23 to cause the excitation element 23 to generate the first excitation light, and beams of the first excitation light pass through the first lens 26 and are guided by the light-path adjusting element 24 to the adjusting element 11 and then are outputted, and the light beams emitted by the second light source 22 pass through the second lens 27 and pass through the first region 241 of the light-path adjusting element 24 and then are incident onto the excitation element 23 to cause the excitation element 23 to generate the second excitation light, and beams of the second excitation light pass through the first lens 26 and are guided by the light-path adjusting element 24 to the adjusting element 11 and then are outputted; then when the switch element is clicked for a fourth time, the path A and the path B are supplied with the first current and the second current, respectively, the light beams emitted by the first light source 21 are incident onto the excitation element 23 to cause the excitation element 23 to generate the first excitation light, beams of the first excitation light pass through the first lens 26 and are guided by the light-path adjusting element 24 to the adjusting element 11 and are outputted, and the light beams emitted by the second light source 22 pass through the second lens 27 and pass through the first region 241 of the light-path adjusting element 24 to be incident onto the excitation element 23 to cause the excitation element 23 to generate the second excitation light, beams of the second excitation light pass through the first lens 26 and are guided by the light-path adjusting element 24 to the adjusting element 11 and then are outputted. Beams of the first excitation light and the second excitation light are outputted simultaneously after passing through the light-path adjusting element and the adjusting element in sequence, so as to realize remote illumination. There should be a certain interval between the moments of clicking the switch element to switch the lighting mode, and a too short interval between the moments of clicking will easily cause the flashlight 10 to enter an SOS mode.

It is understood that the size of the incident light spot can be adjusted by moving the lens holder 12 and the heat dissipation holder 14 of the lens assembly 100 back and forth.

The above merely illustrates some embodiments of the present disclosure, and does not limit the scope of the present disclosure. Any equivalent structure or equivalent process transformation made using the content of the description and drawings of the present disclosure, or directly or indirectly application to other related technical fields in the same way, all fall within the scope of patent protection of the present disclosure.

What is claimed is:

1. A flashlight, comprising:

a lens assembly including an adjusting element; and a light source assembly arranged at a side of the lens assembly, the light source assembly including a first light source, a second light source, an excitation element, and a light-path adjusting element, wherein the first light source and the excitation element are located at one side of the light-path adjusting element and the second light source is located at another side of the light-path adjusting element, light beams emitted by the first light source are incident onto the excitation element to generate first excitation light, and light beams emitted by the second light source pass through the light-path adjusting element and then are incident onto the excitation element to generate second excitation light, and beams of the first and second excitation lights are outputted simultaneously after passing through the light-path adjusting element and the adjusting element in sequence.

2. The flashlight according to claim 1, wherein the light source assembly comprises a light source holder on which the first light source, the second light source, and the light-path adjusting element are arranged, and an optical axis of the first light source coincides with an optical axis of the second light source, and the optical axis of the first light source and the optical axis of the second light source are perpendicular to an optical axis of the adjusting element; the light-path adjusting element is located on a light-exiting path of the first light source, and the excitation element is arranged between the first light source and the light-path adjusting element; the light-path adjusting element has a first region for transmitting light beams emitted by the second light source, and the light beams emitted by the second light source are incident onto the excitation element after passing through the first region; and both the first excitation light and the second excitation light are guided to the adjusting element by the light-path adjusting element.

3. The flashlight according to claim 2, wherein the first region is configured to reflect the first excitation light and the second excitation light.

4. The flashlight according to claim 2, wherein the first region is a light-transmitting hole.

5. The flashlight according to claim 2, wherein the optical axis of the second light source passes through a center of the first region, and the center of the first region is located on the optical axis of the adjusting element.

6. The flashlight according to claim 2, wherein the first light source is an LED light source, the second light source is a laser light source, the light-path adjusting element is a reflector provided with the first region, and the reflector has a reflective surface facing towards the first light source.

7. The flashlight according to claim 6, wherein:

a first lens is provided on the light-exiting path of the first light source, and the first excitation light is incident onto the reflector after passing through the first lens; and a second lens is provided on a light-exiting path of the second light source, and the light beams emitted by the second light source pass through the second lens and then are incident onto the excitation element after passing through the first region.

8. The flashlight according to claim 7, wherein a center of the first light source, a center of the second light source, a center of the first lens, a center of the second lens, and a center of the first region are located on a straight line.

9. The flashlight according to claim 1, further comprising:

a heat dissipation assembly connected to the lens assembly and defining an accommodating cavity, wherein the light source assembly is fixed to the heat dissipation assembly and is located in the accommodating cavity.

10. The flashlight according to claim 9, wherein the lens assembly comprises a lens holder and a heat dissipation holder, wherein the adjusting element is arranged on the lens holder, the heat dissipation holder has one end slidably disposed on the lens holder and another end connected to the heat dissipation assembly; the light source assembly is located between the heat dissipation assembly and the lens holder; and the lens holder is configured to slide relative to the heat dissipation holder to move towards or away from the light source assembly.

11. The flashlight according to claim 10, wherein a surface of the lens holder contacting the heat dissipation holder is provided with a first groove, in which a first rubber ring is provided; and a surface of the heat dissipation holder contacting the lens holder is provided with a second groove, in which a second rubber ring is provided.

12. The flashlight according to claim 10, wherein the adjusting element is fixed and clamped in the lens holder by a sealing gasket.

13. The flashlight according to claim 10, wherein the heat dissipation holder is sleeved on the lens holder, and the lens assembly further comprises a lens cover sleeved on an end of the lens holder away from the heat dissipation holder, and wherein the lens cover is configured to limit the heat dissipation holder when the lens holder gets close to the light source assembly, and the lens holder is provided with a flange at an end close to the heat dissipation holder, wherein the flange is configured to limit the heat dissipation holder when the lens holder gets away from the light source assembly.

14. The flashlight according to claim 13, wherein a limit part is provided on an inner surface of the lens cover.

15. The flashlight according to claim 9, further comprising:

a drive assembly; and a battery assembly, wherein the heat dissipation assembly is provided with a communication cavity, and the drive assembly is located in the communication cavity and is electrically connected to the light source assembly; and the battery assembly is connected to an end of the heat dissipation assembly away from the lens assembly and is electrically connected to the drive assembly.

16. The flashlight according to claim 15, wherein the drive assembly is configured to, in response to receiving a signal that indicates switching a lighting mode twice in a preset interval, control an output of the first light source with a first current and control an output of the second light source with a second current.

17. The flashlight according to claim 15, wherein the battery assembly comprise a battery holder, a battery compartment, and a battery tail compartment, wherein the battery holder is movably accommodated in the battery compartment, the battery compartment and the battery tail compartment are connected to each other, in such a manner that the battery compartment is clamped in the battery tail compartment, or the battery tail compartment is clamped in the battery compartment.

18. The flashlight according to claim 15, wherein the drive assembly is configured to control an output of the first light source with a first current or half of the first current, and/or control an output of the second light source with a second current or half of the second current.

19. The flashlight according to claim 18, wherein when a temperature of the flashlight is higher than a predetermined temperature threshold, the output of the first light source is controlled with half of the first current.

20. A flashlight, comprising:

a lens assembly including an adjusting element; and a light source assembly arranged at a side of the lens assembly, the light source assembly including a first light source, a second light source, an excitation element, and a light-path adjusting element, wherein light beams emitted by the first light source are incident onto the excitation element to generate first excitation light, and light beams emitted by the second light source are incident onto the excitation element to generate second excitation light, and beams of the first and second excitation lights are outputted simultaneously after passing through the light-path adjusting element and the adjusting element in sequence, wherein the light source assembly comprises a light source holder on which the first light source, the second light source, and the light-path adjusting element are arranged, and an optical axis of the first light source coincides with an optical axis of the second light source, and the optical axis of the first light source and the optical axis of the second light source are perpendicular to an optical axis of the adjusting element; the light-path adjusting element is located on a light-exiting path of the first light source, and the excitation element is arranged between the first light source and the light-path adjusting element; the light-path adjusting element has a first region for transmitting light beams emitted by the second light source, and the light beams emitted by the second light source are incident onto the excitation element after passing through the first region; and both the first excitation light and the second excitation light are guided to the adjusting element by the light-path adjusting element.

* * * * *